United States Patent

[11] 3,560,759

| [72] | Inventors | Hansrudi Buehler<br>Ciona Di Carona;<br>Alfred Ernst; Beat Steiner, Zurich,<br>Switzerland |
|---|---|---|
| [21] | Appl. No. | 685,104 |
| [22] | Filed | Nov. 22, 1967 |
| [45] | Patented | Feb. 2, 1971 |
| [73] | Assignee | Maschinenfabrik Oerlikon<br>Zurich, Switzerland |
| [32] | Priority | Nov. 24, 1966 |
| [33] | | Switzerland |
| [31] | | 17,014/66 |

[54] WHEEL SLIP PROTECTION DEVICE
10 Claims, 8 Drawing Figs.

[52] U.S. Cl........................................ 290/17,
318/52, 318/432; 180/65; 105/61
[51] Int. Cl......................................... B61c 15/12
[50] Field of Search........................... 290/17;
318/432, 430, 52, 311, 326, 327, 328, 331, 397,
398, 396; 105/61; 180/65

[56] References Cited
UNITED STATES PATENTS

| 3,060,602 | 10/1962 | Buttendorf.................. | 318/52UX |
| 3,233,163 | 2/1966 | Mishima...................... | 318/327 |
| 3,409,814 | 11/1968 | Azuma et al................. | 318/327X |
| 3,437,896 | 4/1969 | Hoge............................ | 318/52 |

*Primary Examiner*—G. R. Simmons
*Attorney*—McGlew and Toren

ABSTRACT: A device for protecting against slipping of a drive or traction wheel includes means deriving a first traction reduction component which is largely variable during slipping of a traction wheel, and additional means deriving a second traction reduction component which is nearly constant during slipping of a traction wheel. These components are combined to control the current of a driving motor to reduce the slipping of the traction wheel to zero.

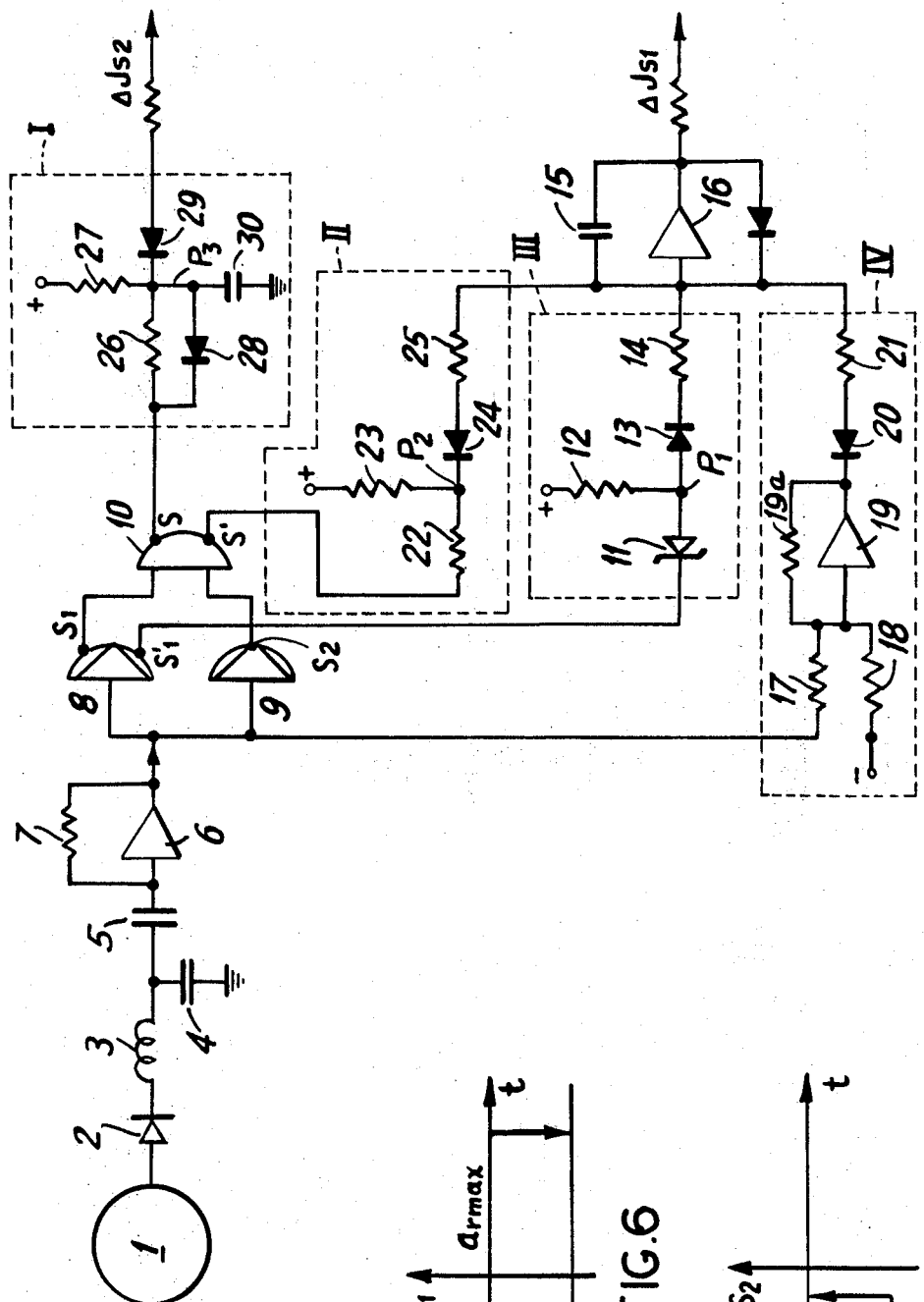

3,560,759

WHEEL SLIP PROTECTION DEVICE

BACKGROUND OF THE INVENTION

There are known wheel slip protection devices which detect acceleration of a drive or traction wheel and interpose a purely mechanical wheel slip braking when a certain acceleration value is exceeded. If the acceleration continues to increase in spite of the wheel slip braking, an adjustment of a stepping control is initiated.

The known devices have the disadvantage that only a constant reduction of traction is possible therewith, so that it is not possible to obtain therewith an adjustment of the acceleration value in accordance with the prevailing adhesive force or coefficient of adhesion between the traction wheel and its running surface, such as a rail. Furthermore, these known devices have the disadvantage that they involve excessive wear and result in output losses.

SUMMARY OF THE INVENTION

This invention relates to wheel slip protection devices and, more particularly, to a novel wheel slip protection device, effective, upon occurrence of wheel slipping, to reduce the tractive power in accordance with the prevailing adhesive force between a wheel and its support surface and which is characterized by substantial elimination of wear and output losses resulting from wheel slippage.

In accordance with the invention, means are provided to obtain or derive a first traction reduction component which is largely variable during wheel slipping, and additional means are provided to derive or obtain a second traction reduction component which is nearly or substantially constant during wheel slipping. These two components are used conjointly to provide a control of the traction adapted or corresponding to the prevailing adhesive force between a wheel and its support surface, such as a rail.

An object of the present invention is to provide an improved wheel slip protection device.

Another object of the invention is to provide an improved wheel slip protection device which adjusts the torque or traction force on a slipping wheel to a value coordinated with the adhesive force between the wheel and its support surface, such as a rail.

A further object of the invention is to provide such a device with which wear and output losses due to slipping are reduced to a minimum.

Still another object of the invention is to provide such a device including means for deriving a first traction reduction component largely variable during wheel slipping and deriving an additional traction reduction component nearly constant during wheel slipping.

A further object of the invention is to provide such a device in which the two derived components are used to produce a traction reduction component coordinated with the prevailing adhesive force between the slipping wheel and its support surface, such as a rail.

BRIEF DESCRIPTION OF THE DRAWINGS

For an understanding of the principles of the invention, reference is made to the following description of typical embodiments thereof as illustrated in the accompanying drawings.

In the Drawings:

FIG. 5 is a schematic wiring diagram of one form of slip protection device embodying the invention;

FIG. 6 is a graphical illustration of the characteristic of a first limit value indicator of the device shown in FIG. 5;

FIG. 7 is a graphical illustration of the characteristic of a second limit value indicator included in the device shown in FIG. 5.

DESCRIPTION OF THE PREFERRED EMBODIMENTS

Figure 1:
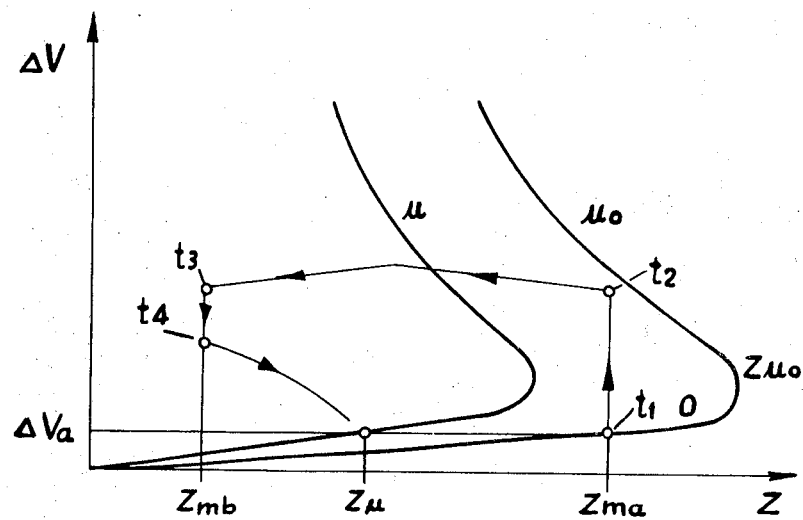
FIG. 1 is a graphical illustration of the interrelation between slip speed and traction or adhesive force.

Referring to FIG. 1, the slip speed $\Delta V$ is shown as a function of the traction or adhesive force $Z$, relative the wheel diameter, with the coefficient of adhesion $\mu$, respectively $\mu 0$, as a parameter. The slip $\Delta V$ represents the difference between the actual peripheral speed of the wheel and the speed of the vehicle.

Figure 2:
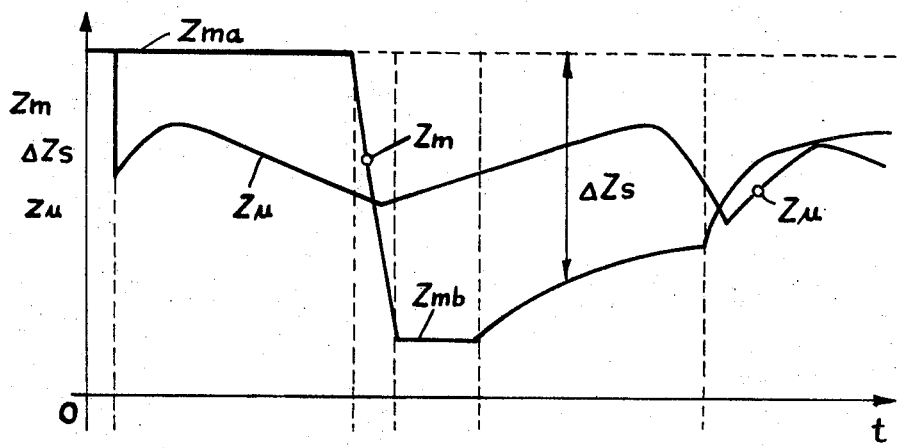
FIG. 2 is a graphical illustration of the time course of the motor torque and the adhesive force during slipping.
Figure 3:
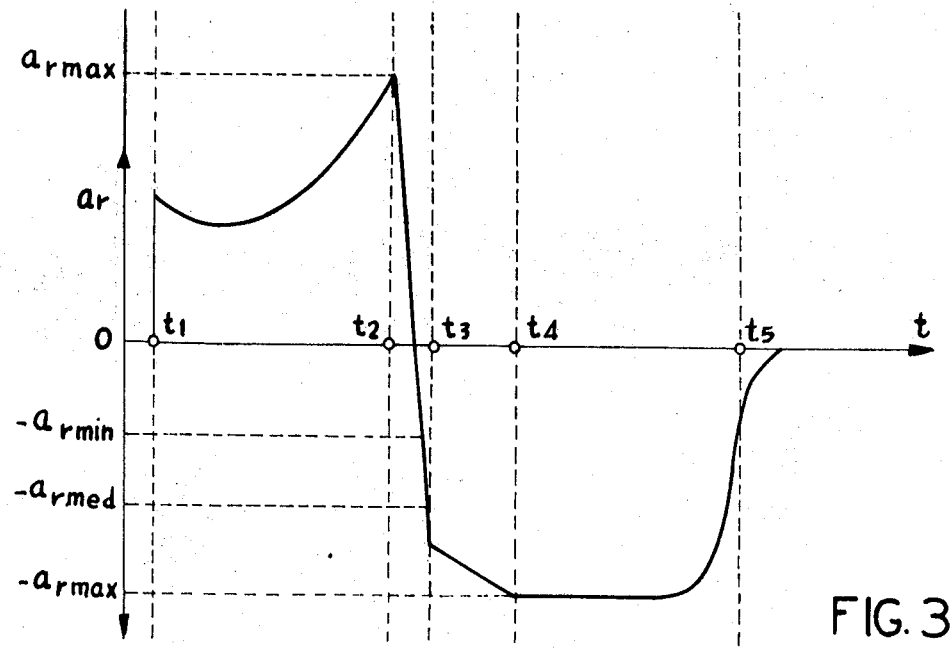
FIG. 3 is a graphical illustration of the wheel acceleration and deceleration during wheel slipping.

If it is assumed that the traction corresponding to the motor torque equals $Zma$ at a given moment, and that the coefficient of adhesion has the value $\mu 0$, there is equilibrium between the traction $Zma$ and the adhesive force $Z\mu 0$, as in the time span $0 - t_1$ of Figs. 1, 2 and 3. Now, if the coefficient of adhesion suddenly drops (at time $t_1$) from value $\mu 0$ to value $\mu$, then $\Delta Va$, of FIG. 1, remains constant in the first moment and $Zma$ exceeds the value $Z\mu 0$, of FIGS. 1 and 2. As a result, the driving wheels are accelerated, provided the motor torque remains constant.

The acceleration $a_r$ of FIG. 3, as well as the slip speed $\Delta V$ of FIG. 1, increase, over the time span $t_1 - t_2$. The force $z\mu$ increases in a direction toward its maximum value with increasing slip speed $\Delta V$, and subsequently decreases, as shown in FIGS. 1 and 2. At time $t_2$, when the maximum acceleration, designated $a_{rmax}$, is attained, the wheel slip protection device of the invention becomes operative. The traction power $Zm$ of the motor is quickly decreased below $Z\mu$ so that $a_r$ also decreases and finally assumes negative values, this action taking place over the time span $t_2 - t_3$. As long as the acceleration $a_r$ still has a positive valve, the slip speed $\Delta V$ continues to increase.

However, deceleration occurs already between time $t_2$ and time $t_3$, so that the slip speed $\Delta V$ drops and the traction force $Z\mu$ again increases in a direction toward its maximum value. Between time $t_3$ and $t_4$, the traction force $Zm$ of the motor remains at its minimum value $Zmb$. However, due to the increasing adhesive force and the difference between $Z\mu$ and $Zmb$, which latter increases with increasing adhesive force, the deceleration curve continues to rise.

In the time span from $t_4$ $Zm$ $t_5$, the reduction $\Delta Zs$ in traction effected by the slip protection device is decreased. The deceleration remains at its maximum $V - a_{rmax}$ until shortly before time $t_5$ and then drops very quickly to 0 because the difference $Z\mu - Zm$ also quickly decreases.

Beyond time $t_5$, the motor traction force $Zm$ first increases very steeply and then increases slowly and steadily. An acceleration, although it is very small, occurs, and leads to larger slip speed $\Delta V$ values and thus to increasing values of $Z\mu$. In this manner, and even at constantly changing coefficients of adhesion, the slip protection device always scans the maximum adhesive force. As soon as this is exceeded, a new slip can occur, the consequence of which occurrence will be the actions thus described.

Figure 4:
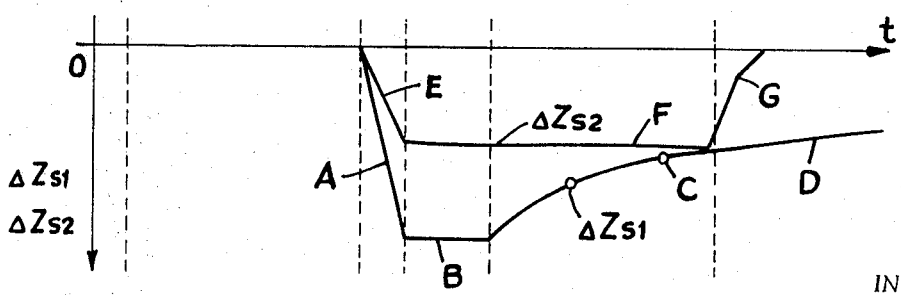
FIG. 4 is a graphical illustration of the traction reduction component, as a function of time.

Referring to FIG. 4, it will be noted that $\Delta Zs$ is composed of two components. The first component $\Delta Zs1$ at first increases steeply, over part A of its characteristic curve. It then remains constant for a certain period represented by part B of its characteristic curve, after which it decreases over part C of its characteristic curve. It then decreases approximately linearly with time, as represented by part D of its characteristic curve. The course of this characteristic curve makes the previously described approach to the maximum adhesive force possible.

The second component $\Delta Zs2$ serves to produce a reliable deceleration of the driving wheels, and is constant in the span from $t_3$ to time $t_5$, as indicated at portion F of its characteristic curve. This component $\Delta Zs2$ increases rapidly at the start of the wheel slip, as indicated by part E of its characteristic curve, and rapidly decreases after time $t_5$, as indicated at part G of its characteristic curve.

FIG. 5 schematically illustrates a circuit arrangement operable to generate the traction reduction components $\Delta Zs1$ and $\Delta Zs2$ illustrated in FIG. 4. A medium frequency tachogenerator 1 is coupled to the drive axle and develops an AC voltage proportional to the peripheral or circumferential speed of the driving wheels. A rectifier bridge 2 and a choke 3 are connected in series to the output of tachogenerator 1, and a first capacitor 4 is connected in parallel to the series combination. Rectifier bridge 2 rectifies the AC output voltage of tachogenerator 1, and the rectified output voltage is smoothed by the filter consisting of choke 3 and first capacitor 4. A second capacitor 5 is coupled between the filter output and the input of a first amplifier 6 which is bridged by a feedback resistor 7 in parallel therewith.

The output of amplifier 6 is connected to the input of a first limit value indicator 8 and the input of a second limit value indicator 9. The output $S_1$ of indicator 8 and the output $S_2$ of indicator 9 are connected to an OR gate 10. The indicators 8 and 9 may comprise, for example, Schmitt triggers. A first circuit arrangement I is connected to the output S of OR gate 10, and a second circuit arrangement II is connected to the reverse output s' of OR gate 10. A third circuit arrangement III is connected to the reverse output S'1 of first limit value indicator 10, and the output of first amplifier 6 is connected with a fourth circuit arrangement IV. The outputs of the second, third and fourth circuit arrangements are connected to the input of a second amplifier 16 which has a third capacitor 15 bridging it and constituting a feedback capacitor.

The third circuit arrangement III consists of a Zener diode 11, a first resistor 12, a first diode 13 and a second resistor 14. Zener diode 11, first resistor 12 and diode 13 are interconnected at a point $P_1$. First resistor 12 is connected to a source of positive potential, as indicated in FIG. 5, and diode 13 and second resistor 14 are connected in series between point $P_1$ and the input of amplifier 16.

The fourth circuit arrangement IV comprises a third resistor 17, a fourth resistor 18, a third amplifier 19, a second diode 20 and a fifth resistor 21. Resistor 17 is connected in series between the output of amplifier 6 and the input of amplifier 19, and resistor 18 is connected to the input of amplifier 19. Diode 20 and resistor 21 are connected in series between the output of amplifier 19 and the input of amplifier 16. A bridging resistor 19a is connected in parallel with amplifier 19.

The second circuit arrangement II is composed of a sixth resistor 22, a seventh resistor 23, a third diode 24 and an eighth resistor 25. Resistor 22 is connected in series between output S' of double OR gate 10 and a point P2. Resistor 23 is connected between a source of positive potential and point P2, and diode 24 and resistor 25 are connected in series between point P2 and the input of amplifier 16.

The first circuit arrangement I comprises a ninth resistor 26, a tenth resistor 27, a fourth diode 28, a fifth diode 29 and a fourth capacitor 30. Resistor 26 is connected between output S of double gate 10 and point P3, with diode 28 bridging resistor 26. Resistor 27 is connected between a source of positive potential and point P3, and capacitor 30 is connected between point P3 and ground. The negative terminal of diode 29 is connected to point P3.

The slip speed protection device schematically shown in FIG. 5 operates in the following manner. As stated, tachogenerator 1 is coupled to the drive axle and generates an alternating voltage proportional to the peripheral or circumferential speed of the drive wheels. This AC voltage is rectified by rectifier bridge 2, which has been shown in a simplified manner, and is smoothed by the filter member consisting of choke 3 and first capacitor 4. Variations in the DC voltage are detected by a differentiation element, i.e., the second capacitor 5, the first amplifier 6 and the feedback resistor 7. A voltage corresponding to the change in the peripheral speed of the wheels, and thus to the acceleration or deceleration of the wheels, is thus available at the output of amplifier 6, as indicated at $a_r$.

The wheel acceleration or deceleration signal $a_r$ is applied to the inputs of the two limit value indicators 8 and 9. The first limit value indicator 8 responds when the wheel acceleration assumes the maximum values $a_{rmax}$, and cuts out when the acceleration or deceleration signal $a_r$ has a desired negative mean value $-a_{rmed}$. Thus, the output signal $S_1$ of limit value indicator 8 has the characteristic shown in FIG. 6. On the other hand, limit value indicator 9 responds at $-a_{rmin}$ and cuts out again at about the same value, so that output $S_2$ has the course or characteristic shown in FIG. 7.

The manner in which the function $\Delta Zs1 = f(t)$, as shown in FIG. 4, is attained will now be described. The flank A of the characteristic curve, between time $t_2$ and $t_3$ is derived because signal S'1 of limit value indicator 8 equals 0 as long as signal $S_1 = 1$. Thus, "1" designates a predetermined negative potential. This is the case between the values $a_{rmax}$ and $a_{rmed}$. Point $P_1$ between Zener diode 11 and resistor 12 is then strongly positive with respect to a neutral conductor, which has not been illustrated, and thus first diode 13 is conductive. The third capacitor 15 is quickly charged through low ohmic resistor 14 and second amplifier 16. The output voltage of amplifier 16 increases rapidly in a negative direction and generates a correction signal corresponding to a correction current $\Delta Js1$.

As soon as the output S'1 becomes "1", which occurs at $-a_{rmed}$ because, at this value, $S_1 = 0$, the anode of diode 13 has a negative potential applied thereto and $\Delta Js1$ as well as $\Delta Zs1$ remain constant due to capacitor 15 being charged, which is represented by portion B of the curve of FIG. 4. The portion C of the curve shown in FIG. 4, extending between times $t_4$ and $t_5$ is derived in the following manner: The two resistors 17 and 18 at the input of third amplifier 19 are so balanced that a negative potential appears at the output of amplifier 19 when the deceleration of the driving wheels reaches the value $-a_{rmax}$. At this time, diode 20 is conductive and capacitor 15 is discharged through resistor 21. The output voltage of amplifier 16 decreases, thus resulting in the portion C of the characteristic curve of the value $\Delta Zs2$.

Elements 22, 23, 24 and 25 serve to generate the portion D of the curve shown in FIG. 4. As long as the reverse signal S' of OR gate 10 is equal to "0", which occurs from time $t_2$ to time $t_5$ because then the output signal S is "1", point $P_2$ between resistor 22 and 23 has a positive potential so that third diode 24 blocks. On the contrary, when S' = 1 and S = 0, point $P_2$ has a negative potential, diode 24 is conductive and capacitor 15 discharges through high ohmic resistor 25. By virtue of this, the voltage at the output of amplifier 16 drops slowly and in a manner approximately linear with time.

The first circuit arrangement I produces the signal $\Delta Zs2 = f(t)$. At the start of wheel slip, output S of OR gate 10 equals "1", with the result that capacitor 30 is charged very quickly through diode 28. Point $P_3$ assumes a negative potential, so that diode 29 is conductive. This produces a current $\Delta Js2$, and thus a traction reduction component $\Delta Zs2$ corresponding to part or portion E of the curve shown in FIG. 4. At the conclusion of the charging of capacitor 30, $\Delta Zs2$ remains constant as indicated by portion F of its curve. However, as soon as output S of OR gate 10 equal "0", diode 28 blocks and capacitor 30 discharges relatively quickly through resistor 26. The current thus fades away through diode 29 due to the positive potential appearing at point $P_3$, producing portion G of the characteristic curve of the signal $\Delta Zs2$.

Figure 8:
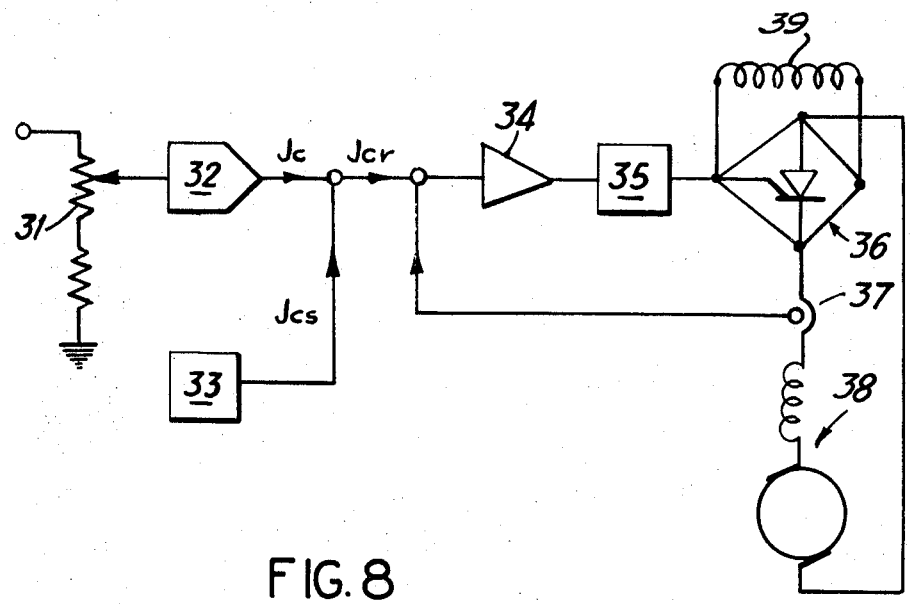
FIG. 8 is a schematic block diagram illustrating the slip protection device of the invention as used with a driving motor supplied through controlled rectifiers.

FIG. 8 illustrates the wheel slip protection device of the invention in connection with a rectifier-supplied group of drive motors. The theoretical motor current value Jc is tapped from a potentiometer 31 through a nonlinear member 32 which may be composed, in a known manner, of biased diodes. Element 32 makes possible a limitation of the motor current. Wheel slip protection device 33 furnishes a theoretical value component Jcs composed of $\Delta Js1$ and $\Delta Zs2 = f(t)$. The resulting theoretical value Jcr, after comparison with the actual value J, is applied to a variable gain amplifier 34, the actual motor current value being derived by means of a direct current converter 37. A control unit 35 operates to control a rectifier bridge 36, comprising controlled rectifiers such as SCR's. Bridge 36 is supplied from the secondary winding 39 of a transformer. A series-wound commutator motor 38 is connected to bridge 36 and operated by the undulating unidirectional current at the output of the bridge.

The described device, after a reversal of the sign of $a_r$ and $\Delta Z s$, can also be used as a protection device against wheel sliding during electrical braking.

While specific embodiments of the invention have been shown and described in detail to illustrate the application of the principles of the invention, it will be understood that the invention may be embodied otherwise without departing from such principles.

We claim:

1. Wheel slip protection device comprising, in combination, acceleration-responsive means connected to a wheel of an electric motor-driven vehicle and deriving an acceleration signal corresponding to positive and negative accelerations of the wheel; and slip control means connected to the output of said acceleration-responsive means, and including first means operable, responsive to said acceleration signal attaining a predetermined magnitude, to derive a first tractive force reduction signal component which is largely variable during wheel slippage, second means operable, responsive to said acceleration signal attaining said predetermined magnitude, to derive a second tractive force reduction signal component which is substantially constant during wheel slippage, and third means connected to said first and second means and, responsive to said first and second signal components, modulating the motor current, in accordance with the prevailing adhesive force between said wheel and its support surface, to reduce said accelerations to substantially zero.

2. Wheel slip protection device comprising, in combination, acceleration-responsive means connected to a wheel of a vehicle and deriving an acceleration signal corresponding to positive and negative accelerations of the wheel; and slip control means connected to the output of said acceleration-responsive means, and including first means operable, responsive to said acceleration signal attaining a predetermined magnitude, to derive a first tractive force reduction signal component which is largely variable during wheel slippage, and second means operable, responsive to said acceleration signal attaining said predetermined magnitude, to derive a second tractive force reduction signal component which is substantially constant during wheel slippage; said acceleration-responsive means comprising tachogenerator means and differentiation means connected to the output of said tachogenerator means and to the input of said slip control means; said slip control means including two limit value indicators each having an output connected to an input of an OR gate; said first means including circuit arrangement means connected to the output of said differentiation means, to another output of one of said limit value indicators and to an output of said OR gate; said second means comprising a first circuit arrangement connected to another output of said OR gate.

3. Wheel slip protection device, as claimed in claim 2, in which said first circuit arrangement is connected to the forward output of said OR gate and includes resistors, diodes and a capacitor deriving said second tractive force reduction signal component; said circuit arrangement means including a second circuit arrangement connected to the reverse output of said OR gate and including resistors and a diode, a third circuit arrangement connected to the reverse output of said first limit value indicator and comprising resistors, a diode and a Zener diode, and a fourth circuit arrangement connected to the output of said differentiation means and including resistors, a diode and an amplifier; said first means further including an amplifier connected to the outputs of said second, third and fourth circuit arrangements, and a feedback capacitor connected across said last-named amplifier.

4. Wheel slip protection device, as claimed in claim 2, in which said tachogenerator is a medium frequency generator, said tachogenerator means further including a rectifier bridge connected to the output of said tachogenerator, a choke having one end connected to the output of said rectifier bridge, and a first capacitor connected to the other end of said choke; said differentiation means comprising a first amplifier and a second capacitor connected between the input of said first amplifier and the other terminal of said choke.

5. Wheel slip protection device, as claimed in claim 4, in which said differentiation means further includes a feedback resistor bridging said first amplifier.

6. Wheel slip protection device, as claimed in claim 2, in which said first circuit arrangement comprises a resistor having a first end connected to a source of positive potential; a diode having its cathode connected to the second end of said resistor; a capacitor connected between said second end of said resistor and ground; a second resistor connected to said second end of said first-mentioned resistor; a second diode bridging said second resistor and having its anode connected to said second end of said first-mentioned resistor; and means connecting the cathode of said diode to the forward output of said OR gate.

7. Wheel slip protection device, as claimed in claim 2, in which said circuit arrangement means includes a second circuit arrangement; said second circuit arrangement including a resistor having its first end connected to a source of positive potential; a diode having its cathode connected to the second end of said resistor; a second resistor connected to the anode of said diode; and a third resistor connected between the cathode of said diode and the reverse output terminal of said OR gate.

8. Wheel slip protection device, as claimed in claim 2, in which said circuit arrangement means includes a third circuit arrangement; said third circuit arrangement including a first resistor having a first end connected to a source of positive potential; a first diode having its anode connected to the second end of said first resistor; a second resistor connected to the cathode of said first diode; and a Zener diode connected between said second end of said first resistor and the reverse output of said first limit value indicator.

9. Wheel slip protection device, as claimed in claim 2, in which said circuit arrangement means includes a fourth circuit arrangement; said fourth circuit arrangement including a first resistor having a first end connected to the output of said differentiation means; an amplifier having its input connected to the second end of said first resistor; a second resistor having its first end connected to a source of negative potential and its second end connected to the input of said amplifier; a diode having its cathode connected to the output of said amplifier; and a third resistor connected in series with the anode of said diode.

10. Wheel slip protection device, as claimed in claim 2, including a controlled rectifier bridge having a control signal input connected to the output of said slip control means; a source of AC potential connected to the input of said controlled rectifier bridge; and a unidirectional undulating current, series wound commutator motor connected to the output of said controlled rectifier bridge and providing said tractive force to said wheel.